(12) United States Patent
Sugishima et al.

(10) Patent No.: US 8,985,678 B2
(45) Date of Patent: Mar. 24, 2015

(54) BODY FRONT STRUCTURE FOR AUTOMOBILE

(75) Inventors: Takayuki Sugishima, Aki-gun (JP); Seiji Fukuyama, Aki-gun (JP); Akira Kawanami, Aki-gun (JP); Junji Nadano, Toyota (JP)

(73) Assignees: Mazda Motor Corporation, Hiroshima (JP); Nishikawa Rubber Co., Ltd., Hiroshima (JP)

( * ) Notice: Subject to any disclaimer, the term of this patent is extended or adjusted under 35 U.S.C. 154(b) by 173 days.

(21) Appl. No.: 13/600,028

(22) Filed: Aug. 30, 2012

(65) Prior Publication Data

US 2013/0221705 A1    Aug. 29, 2013

(30) Foreign Application Priority Data

Aug. 31, 2011    (JP) .................................. 2011-188214

(51) Int. Cl.
| B62D 25/24 | (2006.01) |
| B62D 25/08 | (2006.01) |
| B60R 13/08 | (2006.01) |
| B62D 65/06 | (2006.01) |
| B60R 21/38 | (2011.01) |

(52) U.S. Cl.
CPC .............. *B62D 25/081* (2013.01); *B62D 25/24* (2013.01); *B62D 65/06* (2013.01); *B60R 21/38* (2013.01); *B60R 13/0838* (2013.01)
USPC ....................................................... 296/192

(58) Field of Classification Search
CPC ...... B60R 21/38; B62D 25/081; B62D 25/24; B62D 65/06
USPC ................................. 296/187.04, 192, 193.11
See application file for complete search history.

(56) References Cited

U.S. PATENT DOCUMENTS

| 4,285,540 | A | * | 8/1981 | Harada et al. ................. 296/192 |
| 4,718,712 | A | | 1/1988 | Nakatani |
| 4,721,032 | A | | 1/1988 | Sakamoto |
| 4,819,550 | A | * | 4/1989 | Ioka .............................. 454/147 |
| 4,938,526 | A | * | 7/1990 | Sannomiya et al. ........... 296/192 |
| 4,976,491 | A | * | 12/1990 | Hashimoto et al. ............ 296/192 |

(Continued)

FOREIGN PATENT DOCUMENTS

JP      04-349051      12/1992

OTHER PUBLICATIONS

The first Office Action issued by the Chinese Patent Office on Jul. 3, 2014, which corresponds to Chinese Patent Application No. 201210320045.8 and is related to U.S. Appl. No. 13/600,028; with English language summary.

*Primary Examiner* — Glenn Dayoan
*Assistant Examiner* — Paul Chenevert
(74) *Attorney, Agent, or Firm* — Studebaker & Brackett PC

(57) ABSTRACT

A body front structure for an automobile includes: fenders; an engine compartment; a bonnet; a cowl grille; a center seal which is installed on an upper portion of a vertical wall section of the cowl grille; and side seals which are made from a material that is more flexible than the vertical wall section of the cowl grille. A void where the vertical wall section is not present is formed between each fender and an outside end portion of the vertical wall section of the cowl grille in the vehicle width direction. The side seals each have a seal section which abuts against the bonnet in a closed state and a supporting section which supports the seal section from below, and extend substantially in the vehicle width direction so as to close off the void.

15 Claims, 14 Drawing Sheets

(56) References Cited

U.S. PATENT DOCUMENTS

| | | | |
|---|---|---|---|
| 6,322,440 B1 * | 11/2001 | Nakatani | 454/147 |
| 6,565,148 B1 * | 5/2003 | Teramoto et al. | 296/192 |
| 6,682,131 B2 * | 1/2004 | Hayashi | 296/192 |
| 6,830,288 B2 * | 12/2004 | Eynon et al. | 296/192 |
| 7,316,447 B2 * | 1/2008 | Kelly | 296/192 |
| 7,316,448 B2 * | 1/2008 | Koyama et al. | 296/192 |
| 8,118,352 B2 * | 2/2012 | Rocheblave et al. | 296/193.11 |
| 8,186,749 B2 * | 5/2012 | Serizawa et al. | 296/192 |
| 2013/0113236 A1 * | 5/2013 | Oomen | 296/192 |

\* cited by examiner

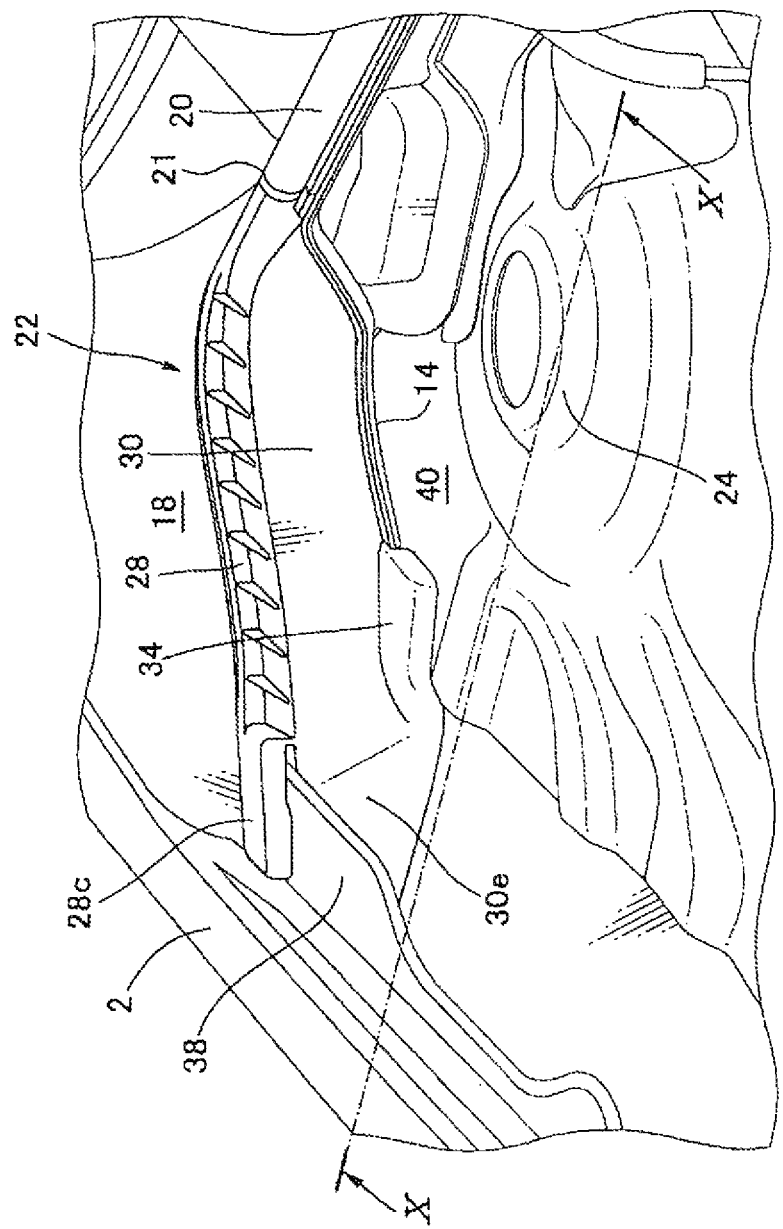

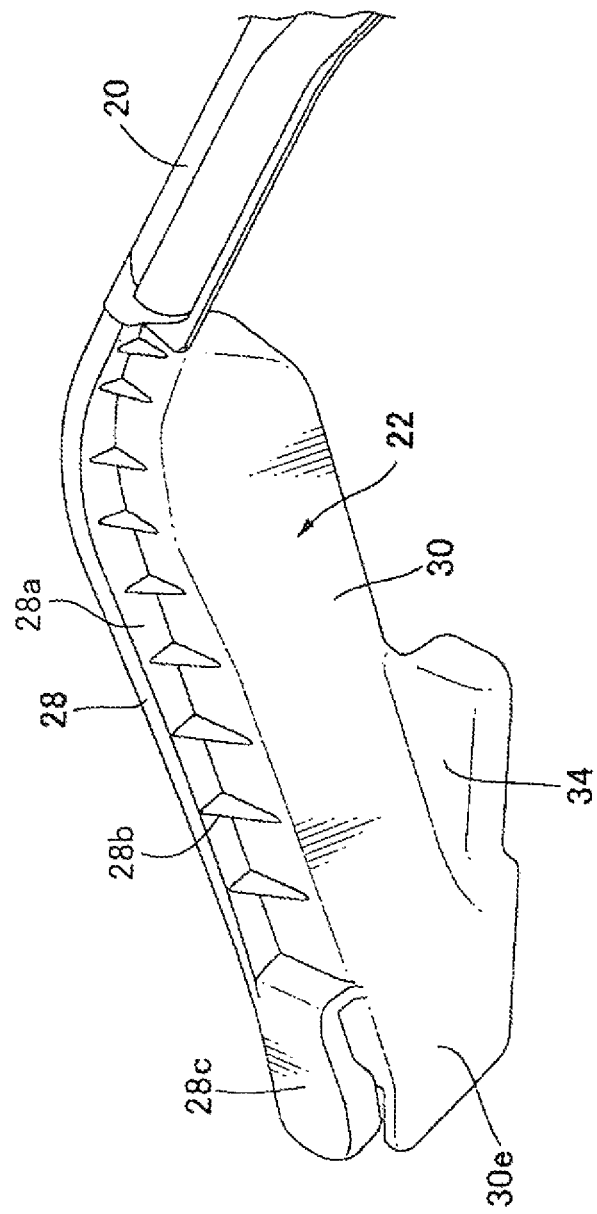

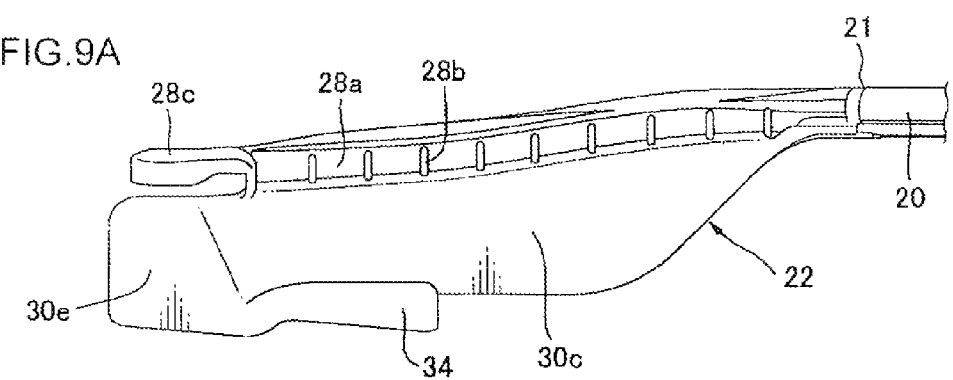
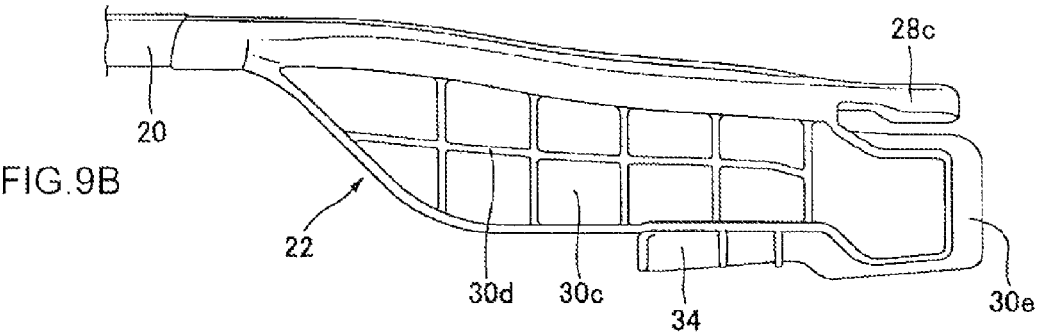
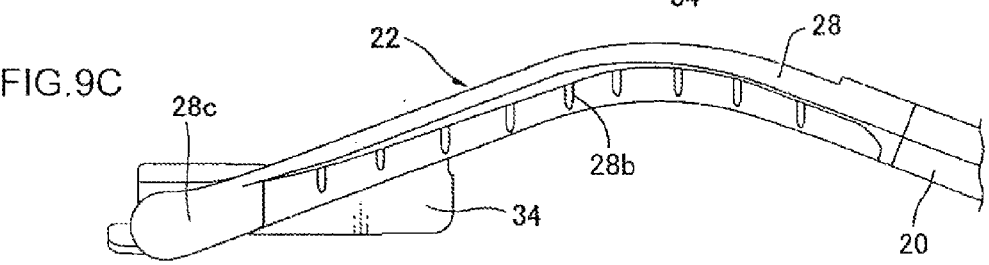
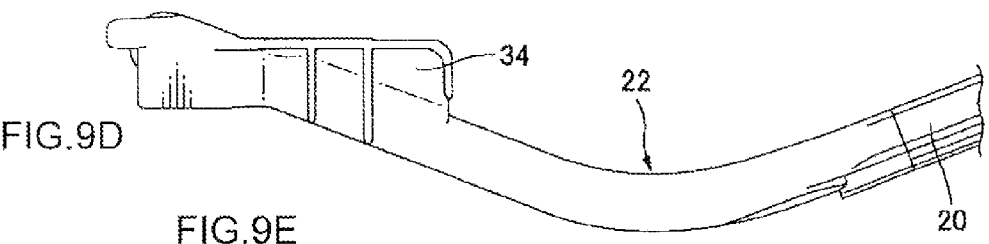
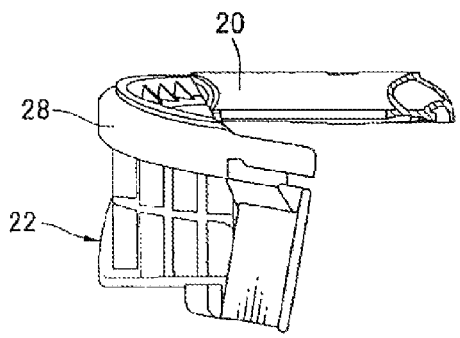
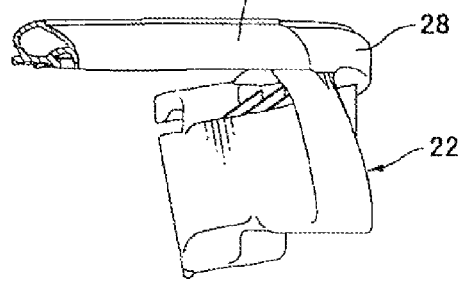

BODY FRONT STRUCTURE FOR AUTOMOBILE

BACKGROUND OF THE INVENTION

1. Field of the Invention

This application is based on Japanese Patent application No. 2011-188214 filed in Japan Patent Office on Aug. 31, 2011, the contents of which are hereby incorporated by reference. The present invention relates to a body front structure for an automobile, and more particularly, to a body front structure for an automobile which prevents infiltration of noise into a cowl.

2. Description of the Background Art

Conventionally, various body front structures for automobiles have been proposed in order to maintain quiet conditions in a vehicle interior by reducing acoustic pressure in corner sections of an engine compartment. For example, in a body front structure for an automobile which is disclosed in Japanese Patent Application Publication No. H04-349051, a dash panel 52 is provided between a cabin 51 and an engine compartment 53 as shown in FIG. 16, and penetration into the cabin 51 of noise produced in the engine compartment 53 is shielded by the dash panel 52. The dash panel 52 is provided with a dash lower panel 54 and a dash upper panel 55, and a dash sound absorbing material 56 is installed on the dash lower panel 54. The upper surface of the engine compartment 53 is covered by an openable and closable bonnet panel 57, and a rear end of the bonnet panel 57 abuts against packing 58. A bonnet sound absorbing material 59 is provided on the inner surface of the bonnet panel 57. Moreover, a cowl side sound absorbing section 60 which diagonally rises up forwards is provided in an integrated manner on the upper portion of the dash sound absorbing material 56, and a sound insulating space 62 is formed between the cowl side sound absorbing section 60 and a cowl box 61.

In the conventional body front structure for an automobile shown in FIG. 16, the upper edge portion of the cowl side sound absorbing section 60 abuts against the bonnet sound absorbing material 59, and therefore it is possible to reduce the acoustic pressure at the corner sections in the engine compartment 53 by means of this cowl side sound absorbing section 60 and a sound insulating space 62 and infiltration of noise into the cabin 51 can be prevented, thus maintaining quiet conditions therein.

However, in a conventional body front structure for an automobile as described above, a sound insulating space 62 is formed to the front side of the packing 58 at the rear end of the bonnet panel 57, and hence there is a problem in that the upper portion of the engine compartment is narrowed accordingly, and furthermore, since a dual seal structure is adopted in which the packing 58 and the upper end portion of the cowl side sound absorbing section 60 abut against the inner surface of the bonnet panel 57, then this structure is wasteful.

A further known conventional example of a body front structure for an automobile is one in which a sealing member is provided on the cowl grille so as to span between the left and right fenders.

On the other hand, although it is necessary to prevent infiltration of noise from the engine compartment into the cabin, in addition to this it is also possible to seek to protect pedestrians by enlarging the collision stroke between the bonnet and members of the body therebelow, in the event of a collision with a pedestrian. However, the prior art described above does not provide a structure which achieves sufficient protection of pedestrians in this way.

SUMMARY OF THE INVENTION

The present invention was devised in order to resolve the problems of the prior art described above, an object thereof being to provide a body front structure for an automobile whereby protection of pedestrians can be achieved as well as preventing infiltration of noise into the cabin from the engine compartment.

In order to achieve the aforementioned object, the present invention relates to a body front structure for an automobile having: a pair of fenders arranged on either side of a front of a body; a front compartment accommodating a drive source and arranged between these fenders; a bonnet which openably and closably covers the front compartment from above; and a cowl grille which extends in a vehicle width direction and includes a vertical wall section positioned between the front compartment and a cabin. The body front structure includes: a center seal, which is installed on an upper part of the vertical wall section of the cowl grille and is made from an elastic member that seals a gap between the vertical wall section of the cowl grille and the bonnet in a closed state; and side seals which are installed on the outer sides of the center seal in the vehicle width direction and are made from a material that is more flexible than the vertical wall section of the cowl grille. A void where the vertical wall section is not present is formed between each of the fenders and an outside end portion of the vertical wall section of the cowl grille in the vehicle width direction, and the side seals each have a seal section which abuts against the bonnet in a closed state and a supporting section which supports the seal section from below, and extend substantially in the vehicle width direction so as to close off the void.

BRIEF DESCRIPTION OF THE DRAWINGS

FIG. 7 is an enlarged perspective diagram of the principal portion of FIG. 1;

FIG. 8 is a perspective drawing showing an extracted view of a side seal which is provided on the vehicle right side of the body front structure for an automobile according to an embodiment of the present invention, as observed diagonally from above and from the front;

FIGS. 9A to 9F show extracted views of a side seal which is provided on the vehicle right side of the body front structure for an automobile according to an embodiment of the present invention, where FIG. 9A is a front view, FIG. 9B is a rear view, FIG. 9C is a plan view, FIG. 9D is a bottom view, FIG.

9E is a side view as viewed from the vehicle right side and FIG. 9F is a side view as viewed from the vehicle left side;

DESCRIPTION OF THE PREFERRED EMBODIMENTS

Figure 1:
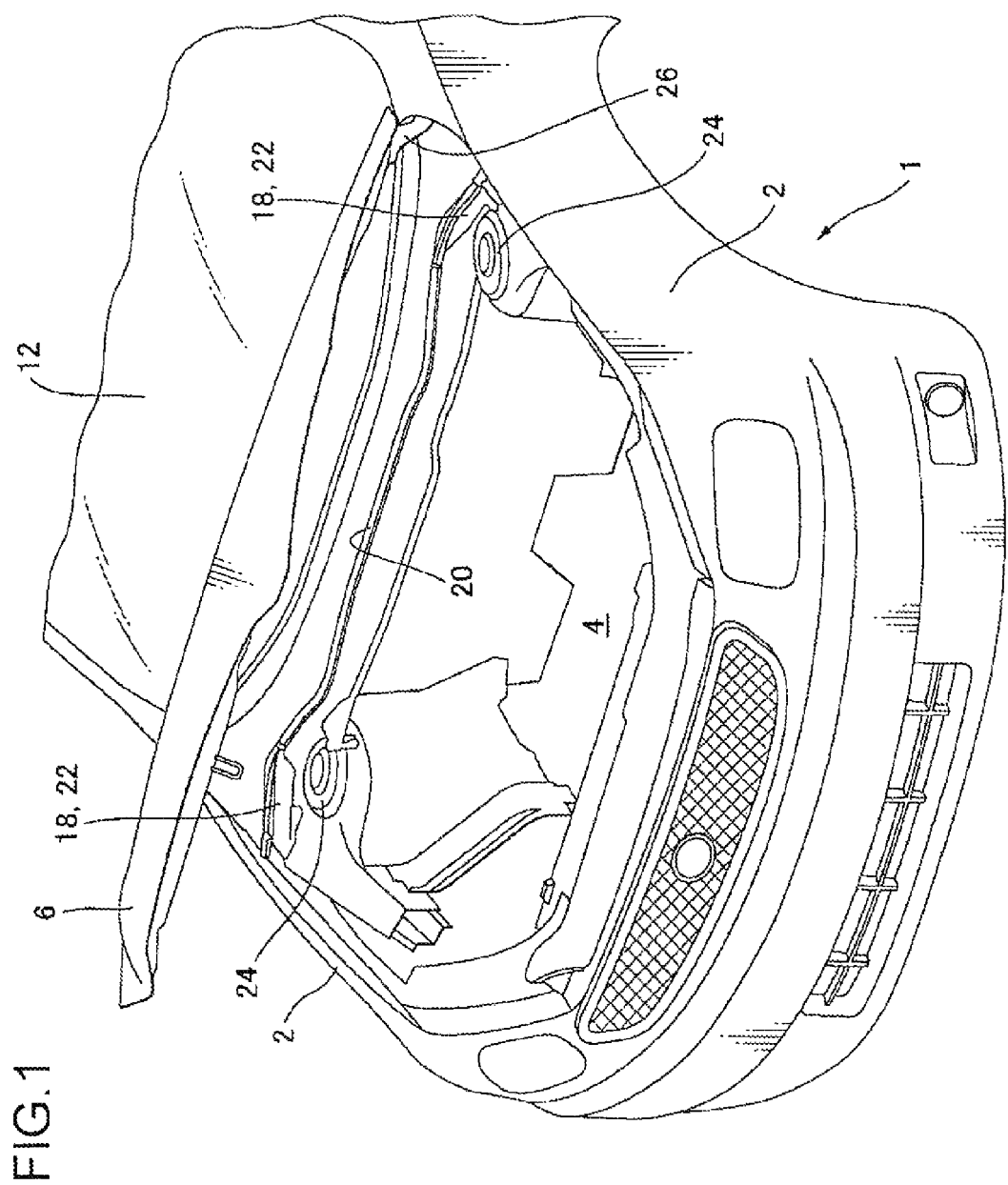
FIG. 1 is a perspective drawing of the body front structure for an automobile according to an embodiment of the present invention as viewed diagonally from above and from the front.
Figure 2:
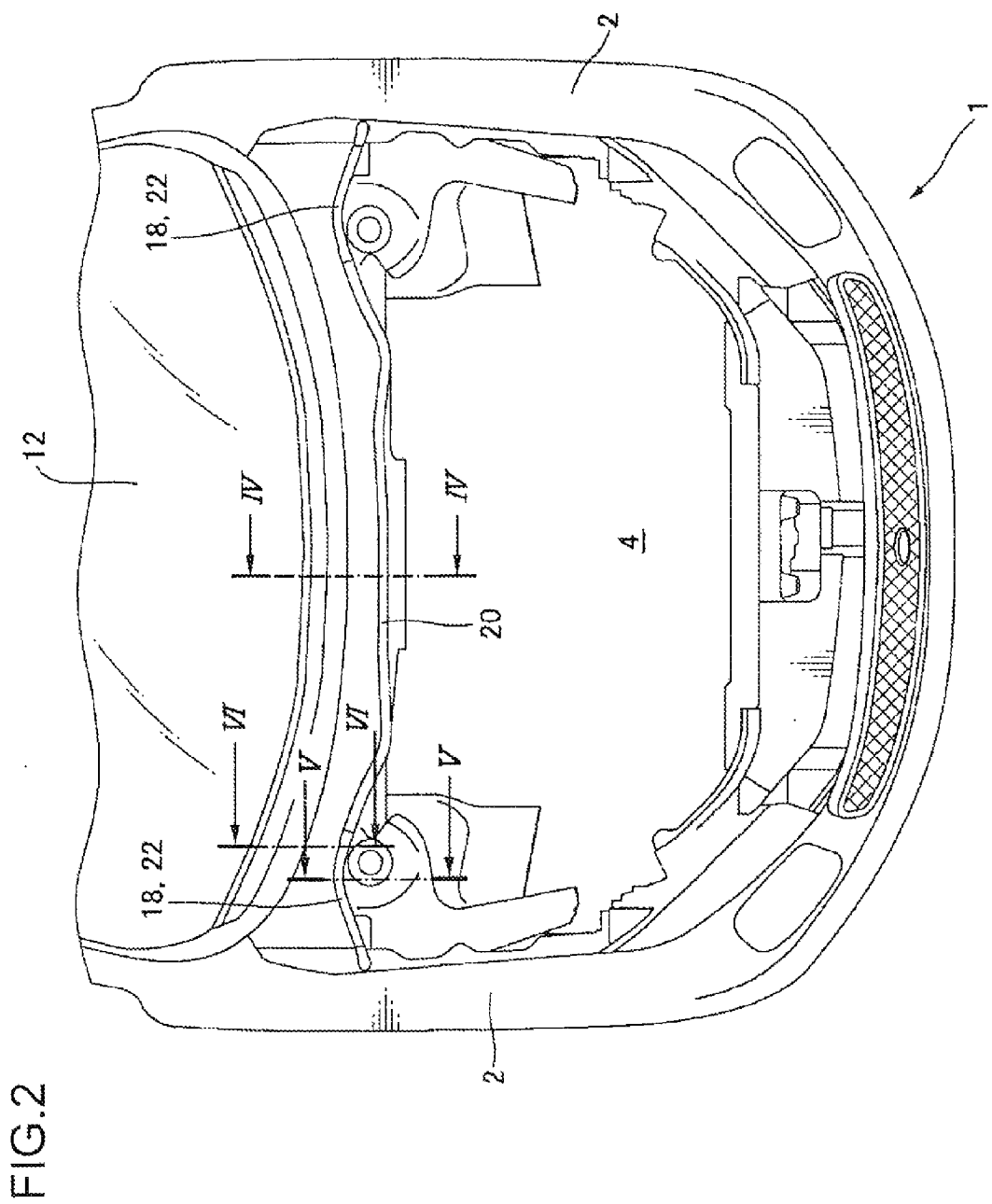
FIG. 2 is a plan diagram of the body front structure for an automobile according to an embodiment of the present invention as viewed from above.
Figure 3:
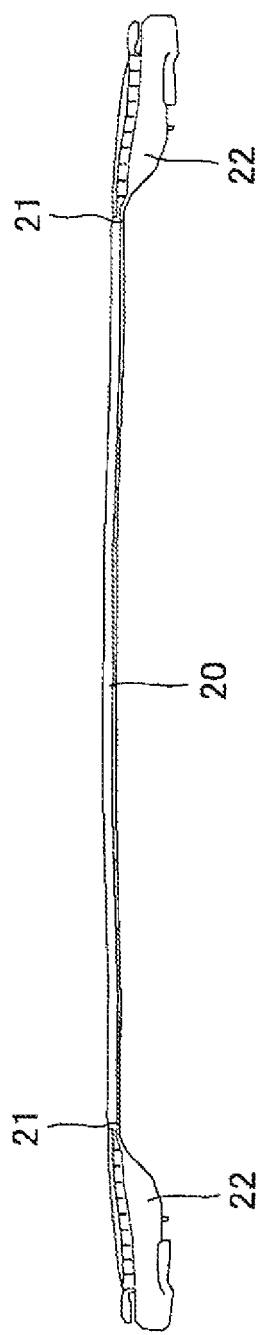
FIG. 3 is a front view diagram showing an extracted view of a center seal and side seals provided in a body front structure for an automobile according to an embodiment of the present invention.
Figure 4:
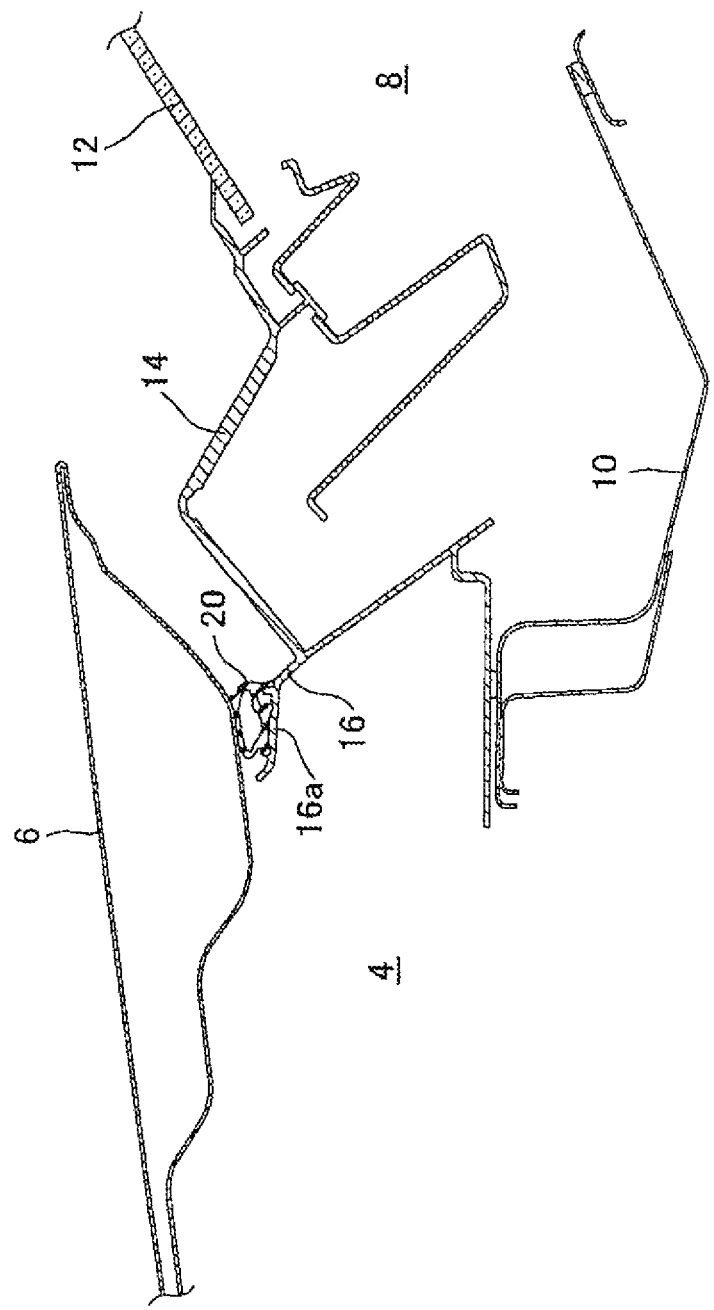
FIG. 4 is a cross-sectional diagram viewed along line IV-IV in FIG. 2.
Figure 5:
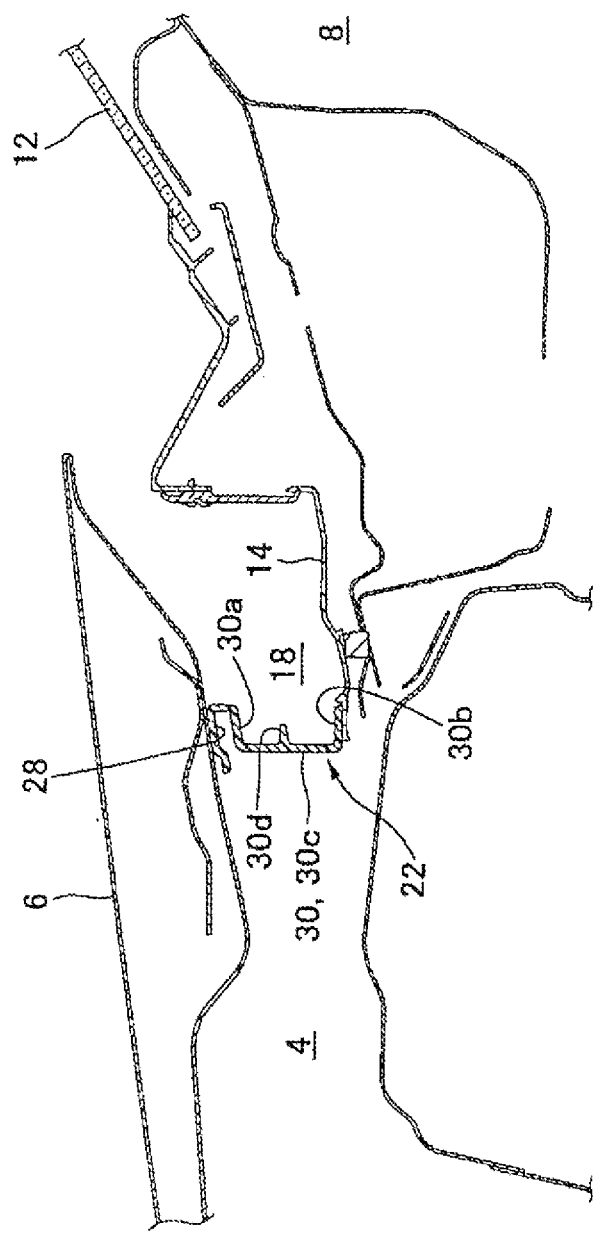
FIG. 5 is a cross-sectional diagram viewed along line V-V in FIG. 2.
Figure 6:
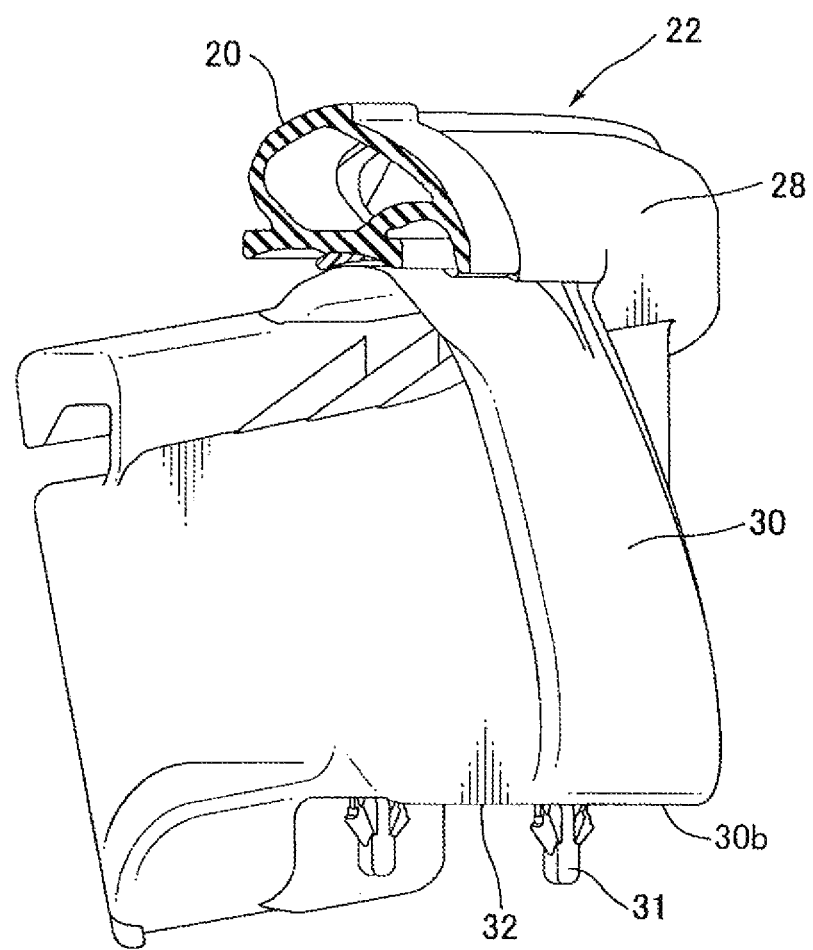
FIG. 6 is a cross-sectional diagram viewed along line VI-VI in FIG. 2.

Below, a body front structure for an automobile according to an embodiment of the present invention is described with reference to the accompanying drawings. Firstly, the basic structure of the body front structure for an automobile according to the present embodiment will be described with reference to FIG. 1 to FIG. 6. FIG. 1 is a perspective diagram of a body front structure for an automobile according to an embodiment of the present invention as viewed diagonally from above and from the front. FIG. 2 is a plan diagram of the body front structure for an automobile according to the present embodiment as viewed from above. FIG. 3 is a front view diagram showing an extracted view of a center seal and a side seal provided in a body front structure for an automobile according to an embodiment of the present invention. FIG. 4 is a cross-sectional diagram along line IV-IV in FIG. 2. FIG. 5 is a cross-sectional diagram along line V-V in FIG. 2. FIG. 6 is a cross-sectional diagram along line VI-VI in FIG. 2.

As shown in FIG. 1 and FIG. 2, the body front structure 1 comprises a pair of fenders 2 on either side, and an engine compartment 4 which is formed between these fenders 2. An engine (not illustrated) which is a drive source for the vehicle is disposed inside this engine compartment 4. Here, the drive source may also include an electric motor, hybrid system, or the like, apart from an engine such as an internal combustion engine. The engine compartment 4 corresponds to the "front compartment" in the present invention.

A bonnet 6 is provided on the upper surface of the engine compartment 4. The bonnet 6 covers the engine compartment 4 openably and closably due to the rear end portion thereof being installed on the body via bonnet hinges 26.

Furthermore, as shown in FIG. 4, a cowl front panel 10 is provided between the engine compartment 4 and the cabin 8, and a cowl grille 14 which extends through the whole range of the vehicle width direction is provided to the front side of the lower end portion of the front windscreen 12. Furthermore, this cowl grille 14 has a vertical wall section 16 made of resin extending diagonally forwards and upwards, provided integrally on the front end side of the grille 14. As described in detail hereinafter, the vertical wall section 16 of the cowl grille 14 is formed only in the central region of the vehicle width direction, and a void 18 where no vertical wall section 16 is present (see FIG. 5 and FIG. 7) is formed on the left and right end portions of the cowl grille 14.

As shown in FIG. 4, a center seal 20 extending in the vehicle width direction is installed on the upper end surface 16a of the vertical wall section 16 of the cowl grille 14. The center seal 20 has a hollow cross-section and a cavity is formed inside the center seal 20. This center seal 20 shields the penetration of noise, and the like, from the engine compartment 4 into the cabin 8, by abutting against the lower surface of the bonnet 6 which is in a closed state.

As shown in FIG. 3, a side seal 22 is formed integrally via a coupling member 21 (see FIG. 7) on either end of the center seal 20.

Here, the center seal 20 is made from an elastic member, and the side seals 22 are made from a rubber material (such as EPDM rubber or a thermoplastic elastic (TPE)) having greater pliability than the vertical wall section 16 of the cowl grille 14, which is made of hard resin. However, the side seals 22 are formed to have a higher rigidity than the center seal 20 to ensure the standing stability described below. In order that there is a difference in rigidity between the members, for example, the center seal 20 is made of a sponge material having a foamed structure so as to have low rigidity, and the side seals 22 are made of a solid material without a foamed structure, so as to have high rigidity.

Next, the installation positions of the side seals 22 will be described with reference to FIG. 1 and FIG. 7. FIG. 7 is an enlarged perspective diagram of the principal portion of FIG. 1. The side seals 22 shown in FIG. 1 and FIG. 7 are arranged on both the left and right-hand sides of the vehicle, and are provided so as to extend substantially in the vehicle width direction in order to close off the voids 18 where the vertical wall section 16 of the cowl grille 14 is not present.

Moreover, strut tower fastening sections 24 are provided in the vicinity of the front surface of the side portion of the cowl grille 14, and the bonnet hinges 26 (see FIG. 1) are provided in the vicinity of the outer end portions of the cowl grille 14 in the vehicle width direction. Furthermore, the side seals 22 are formed in a bent shape in plan view so as to avoid the strut tower fastening sections 24 and increase the supporting rigidity in the up/down direction, and are each provided in a region (see FIG. 1) from a rear position of the strut tower fastening section 24 until a front position of the bonnet hinge 26.

Next, the shape, and the like, of the side seals 22 will be described in detail with reference to FIG. 5, FIG. 7, FIG. 8 and FIGS. 9A to 9F. FIG. 8 is a perspective diagram showing an extracted view of the side seal which is provided on the right side of the vehicle in the body front structure for an automobile according to an embodiment of the present invention, as viewed diagonally from above and from the front. FIGS. 9A to 9F are diagrams showing extracted views of the side seal which is provided on the right side of the vehicle in the body front structure for an automobile. Here, FIG. 9A is a front view, FIG. 9B is a rear view, FIG. 9C is a plan view, FIG. 9D is a bottom view, FIG. 9E is a side view as viewed from the vehicle right side and FIG. 9F is a side view as viewed from the vehicle left side. Here, a side seal 22 which is provided on the right side of the vehicle (the right-hand side as viewed from the driver's seat) is described, but the side seal 22 provided on the left side of the vehicle also has a similar basic structure and hence a shape which is symmetrical in the left/right direction (width direction) is achieved.

The side seal 22 comprises a seal section 28 which shields infiltration of noise, and the like, from the engine compartment 4 into the cabin 8, by abutting against the lower surface of the bonnet 6 in a closed state, and a supporting section 30 which supports the seal section 28 from the lower side. The seal section 28 and the supporting section 30 are formed in an integrated manner by die molding, or the like.

As shown in FIG. 5, the supporting section 30 of the side seal 22 has an upper wall 30a and a lower wall 30b, which extends towards the rear, and a vertical wall 30c which connects together the front end portions of the upper wall 30a and the lower wall 30b. By this means, the supporting section 30 is formed so as to have a square C-shaped cross-section which is open towards the rear. Furthermore, the seal section 28 is formed so as to have a square C-shaped cross-section which is open towards the front side. By forming the side seal 22 with a shape of this kind, it is possible to make the side seal 22 stand upright, independently, on the cowl grille 14. The cross-sectional shape of the seal section 28 of the side seal 22 shown in FIG. 5 depicts a state where the bonnet 6 is closed. In other words, the seal section 28 is deformed into a square C-shaped cross-section as shown in FIG. 5 by receiving a downwards pressing force from the lower surface of the bonnet 6 when the bonnet 6 is closed. On the other hand, when the bonnet 6 is opened, the deformation described above is released, and the upper wall portion of the seal section 28 (the portion corresponding to the upper edge of the C shape) opens upwards and returns to a shape such as that shown in FIG. 7, FIG. 8 and FIG. 9C, and so on.

The front surface of the vertical wall 30c of the supporting section 30 is formed so as to be a flat surface having a good visual appearance. Reinforcing ribs 30d which are reinforcing members for increasing the supporting rigidity in the up/down direction are formed in an integrated manner on the rear surface of the supporting section 30. The reinforcing ribs 30d are formed in a lattice shape (see FIG. 9B), but although the vertical ribs are essential, the horizontal ribs may be omitted.

Furthermore, reinforcing ribs 28b extending in the vertical direction are provided on the front surface 28a of the seal section 28 in order to increase the supporting rigidity in the up/down direction (see FIG. 9A).

The reinforcing ribs 28b are preferably formed only on the lower side of the seal section 28 such that the upper part of the seal section 28 abutting against the lower surface of the bonnet 6 can be flexibly and elastically deformed. More preferably, the reinforcing ribs 28b are formed in a triangular shape when viewed from the side, in such a manner that the projecting length of the reinforcing ribs 28b becomes smaller toward the upper side. This enables the seal section 28 to be flexibly and elastically deformed, and thereby brought into close contact with the lower surface of the bonnet 6.

A body installation section 32 forming a flat surface for installing the side seal 22 on the cowl grille 14 via a clip 31 (see FIG. 6) is formed on the lower wall 30b of the supporting section 30 of the side seal 22.

Next, as shown in FIG. 7, FIG. 8, FIG. 9C and FIG. 9D, and the like, the side seal 22 has a leg section 34 projecting towards the front side and formed in a substantially triangular shape in plan view, the leg section 34 being provided in an integrated manner in the vicinity of the outer end portion of the supporting section 30 in the vehicle width direction. The standing stability of the side seal 22 is improved by the presence of this leg section 34.

Next, as shown in FIG. 6 and FIG. 9F, the inside end of the seal section 28 of the side seal 22, in the vehicle width direction, is connected (welded, or adhered by heat-melting) so as to form a continuous surface with the center seal 20 which has a hollow cross-section.

More specifically, the side seal 22 is formed by die molding and the center seal 20 is formed by extrusion molding, and after these members have been manufactured separately, they are connected in an integrated manner by welding, or the like. It is also possible to place both ends of the center seal 20 in dies for molding the side seals 22, and to integrate the both ends of the center seal 20 with each of the side seals 22 at the same time when the side seals 22 are molded.

Figure 10:
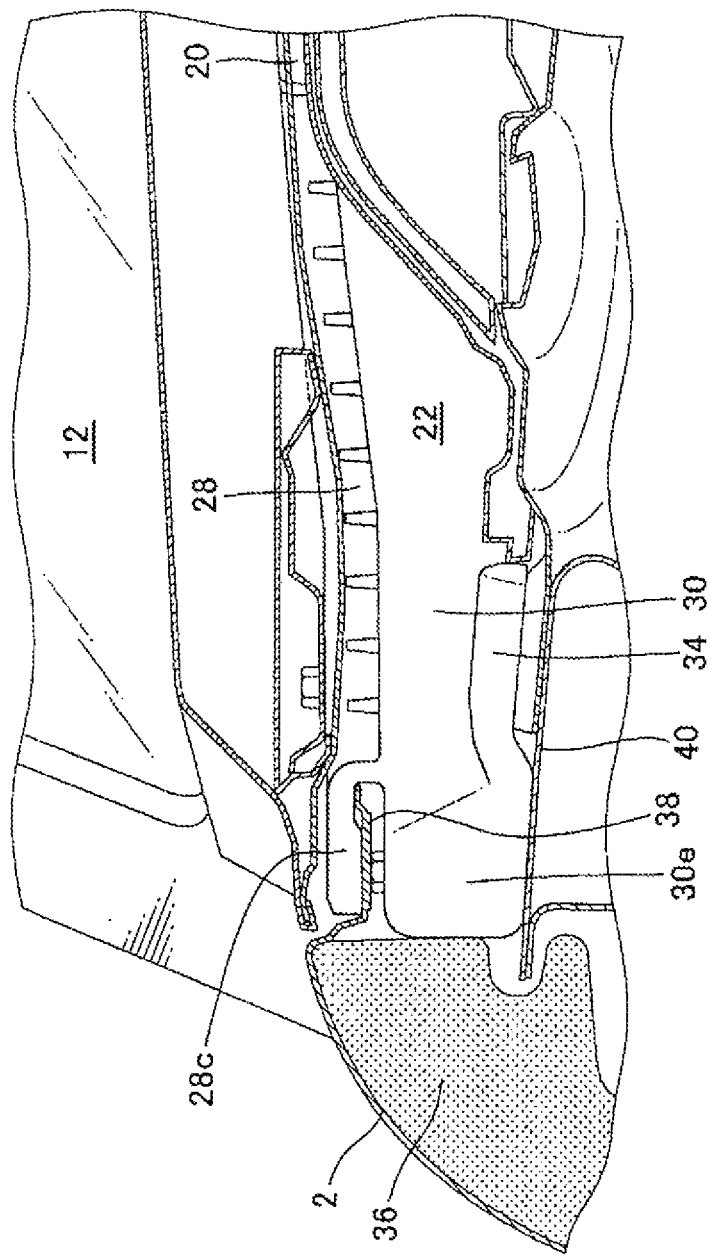
FIG. 10 is a cross-sectional diagram viewed along line X-X in FIG. 7.

Next, as shown in FIG. 7 and FIG. 10, a sponge-shaped sound insulating material 36 is installed inside the fenders 2. Moreover, a fender installation bracket 38 which is a fender installation section extending to the inside of the vehicle width direction is provided in each fender 2. The fender installation bracket 38 is provided at a position where it forms a gap with the upper surface of the body member 40 therebelow, and an end section 30e of the supporting section 30 of side seal 22 is inserted into this gap. The outer end surface of the end section 30e of the supporting section 30 of the side seal 22 and the inner end surface of the sound insulating material 36 of the fender 2 described above abut against each other.

Moreover, the seal section 28 of the side seal 22 includes an extension section 28c which extends outwards in the vehicle width direction, and this extension section 28c is provided so as to cover the fender installation bracket 38 from above.

Next, the action and beneficial effects of the body front structure for an automobile according to the embodiment of the present invention described above will be explained. Firstly, since a void 18 where no vertical wall section 16 is present is formed between the fender 2 and the outer end portion of the vertical wall section 16 of the cowl grille 14 in the vehicle width direction, then in the central region of the cowl grille 14, the rigidity of the cowl grille 14 during travel is guaranteed by the vertical wall section 16, while in the vicinity of the outer end portion of the vehicle width direction, the required collision stroke between the bonnet 6 and the body member 40 in the event of a collision with a pedestrian can be guaranteed by the void 18 in the cowl grille 14. Furthermore, since the void 18 is closed off by the side seal 22, then it is possible to prevent infiltration of noise into the inner side of the cowl grille 14 (cabin 8) from the engine compartment 4, without decline in the collision performance. Moreover, since the side seal 22 includes the seal section 28 which abuts against the bonnet 6 in a closed state and is deformed, and the supporting section 30 for supporting the seal section 28 from below, different functions are served by the seal section 28 and the supporting section 30. Accordingly, when the bonnet 6 is closed, mainly the seal section 28 is deformed, and the amount of deformation (amount of deflection) of the supporting section 30 can be diminished. As a result, the supporting section 30 can keep its shape over a long period of time and stably support the seal section 28 at an appropriate position (a position where the seal section 28 abuts against the lower surface of the bonnet 6 in a closed state), and the seal section 28 can be flexibly and elastically deformed and brought into close contact with the bonnet 6. Therefore, the side seal 22 including the seal section 28 and the supporting section 30 can maintain airtight properties over a long period of time. Although it might be possible to pack a porous sponge-shaped member inside the void, instead of the side seal 22, the side seal 22 according to the present embodiment is slimmer and has a better visual appearance, as well as having high durability (oil resistance, water resistance, heat resistance) and waterproofing properties.

Moreover, because the supporting section 30 of the side seal 22 includes an upper wall 30a and a lower wall 30b which extend in the front/rear direction on the upper edge and lower edge, respectively, and includes a vertical wall 30c which extends in the up/down direction so as to connect together the upper wall 30a and the lower wall 30b, then it is possible to make the side seal 22 stand upright in a stable manner. Accordingly, it is possible to prevent the occurrence of gaps due to long-term shape disruption of the side seal 22, and sound insulating properties can be improved.

Furthermore, by connecting the vertical wall 30c to the front end portions of the upper wall 30a and the lower wall 30b, the supporting section 30 of the side seal 22 is formed in a square C shape which is open towards the rear side in a cross-sectional view, and since a body installation section 32 for installing the side seal 22 on the cowl grille 14 via a clip 31 is provided on the lower wall 30b of the supporting section 30, then in contrast to cases where the vertical wall 30c is connected to the center of the upper wall 30a and the lower wall 30b in the front/rear direction, for example (where the supporting section 30 has an I-shaped cross-sectional shape), a relatively broad flat surface is formed on the upper surface of the lower wall 30b, even if the overall thickness of the side seal 22 in the front/rear direction is not increased greatly. Therefore, it is possible to ensure a sufficient surface area of the body installation section 32, while keeping the side seal 22 slim in the front/rear direction.

Furthermore, the side seal 22 has reinforcing ribs 30d on the rear surface side of the vertical wall 30c of the supporting section 30, and therefore it is possible to effectively reinforce the side seal 22 by means of the reinforcing ribs 30d, while also improving the visual appearance of the interior of the engine compartment 4 when the bonnet 6 is opened. Moreover, if the side seal 22 is formed by punching out, then a further merit is obtained in that the punching out process is facilitated.

Furthermore, since the side seal 22 includes a leg section 34 which projects towards the front side from the supporting section 30, then the side seal 22 stands upright even more readily, and leaking of noise which escapes below the side seal 22 from the engine compartment 4 can be suppressed.

Moreover, since the center seal 20 has a hollow cross-section and the seal section 28 of the side seal 22 has an open cross-section which is open towards the front side and is provided so as to form a continuous surface with the end portion of the center seal 20, then it is possible to prevent water from infiltrating inside the center seal 20, by means of the seal section 28 of the side seal 22.

Moreover, since the seal section 28 of the side seal 22 is connected to the center seal 20 in an integrated manner, then it is possible reliably to prevent leaking of noise from the gap between the seal section 28 of the side seal 22 and the center seal 20, and it is also possible to support the center seal 20 by means of the side seal 22. Furthermore, compared to a case where the side seal 22 and the center seal 20 are formed separately, the unit price of the component increases, but it is possible to achieve a marked reduction (of up to ⅓) in the management time requirement and component packaging, and the like, on the production line.

Moreover, since the fender 2 has a fender installation bracket 38 which extends inwards in the vehicle width direction, a gap is formed between this fender installation bracket 38 and the body member 40 therebelow, and the end section 30e of the supporting section 30 of the side seal 22 is inserted into this gap, then it is also possible to guarantee sound insulating properties below the fender 2, while ensuring protection of a pedestrian who collides with the fender 2. In other words, it is possible to achieve both protection of pedestrians and sound insulating properties below the fender 2.

Furthermore, the seal section 28 of the side seal 22 includes an extension section 28c which extends outwards in the vehicle width direction and since this extension section 28c is provided so as to cover the fender installation bracket 38, the continuity of the seal is improved and furthermore the visual appearance of the interior of the engine compartment 4 can be improved by concealing the fender installation bracket 38.

Moreover, since the strut tower fastening section 24 is provided in the vicinity of the front surface of the side portion of the cowl grille 14, the bonnet hinge 26 is provided in the vicinity of the outer end portion of the cowl grille 14 in the vehicle width direction, the void 18 is formed so as to avoid the strut tower fastening section 24, and the supporting section 30 of the side seal 22 has higher rigidity than the center seal 20 in such a manner that the side seal 22 can stand upright, and is formed in a curved fashion along the vehicle width direction so as to be arranged in a range from a rear position of the strut tower to a front position of the bonnet hinge 26, then it is possible to improve the upright stability of the side seal and to improve the assembly characteristics of the suspension. More specifically, since the rigidity of the supporting section 30 of the side seal 22 is higher than the center seal 20, then it is possible to raise the standing stability of the side seal 22. Furthermore, since the supporting section 30 of the side seal 22 is arranged in a region between the strut tower and the bonnet hinge 26, while avoiding the strut tower fastening section 24, then it is possible to assemble and maintain the suspension without removing the cowl grille 14. Moreover, the rigidity of the side seal 22 in the up/down direction can be improved by the fact that the supporting section 30 of the side seal 22 has a curved shape. Furthermore, since a side seal 22 having a height and elasticity (pliability) is arranged in the vicinity of the strut tower and the bonnet hinge 26, which have relatively high strength and are positioned in the vicinity of the cowl grille 14, then it is possible to increase the amount of collision absorption without creating excessive reaction force (damage) to a colliding object, such as a pedestrian.

Figure 11:
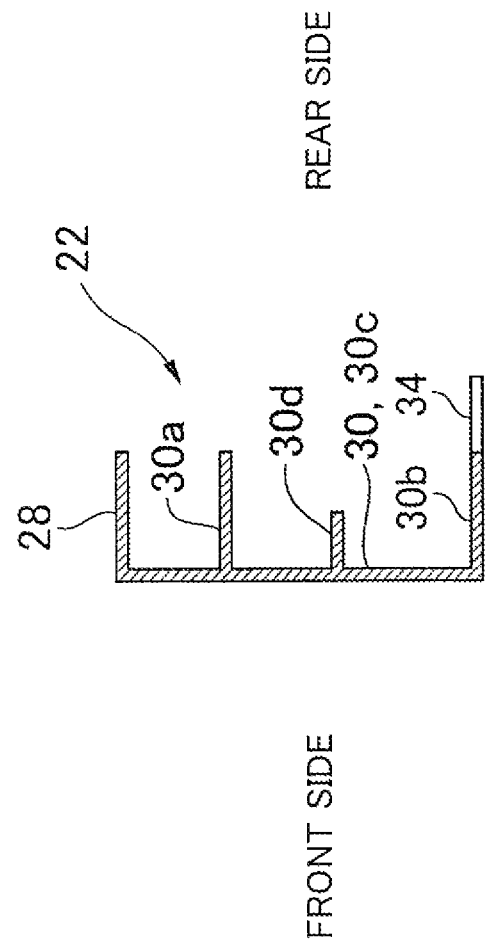
FIG. 11 is a cross-sectional diagram showing a modification example of a side seal of a body front structure for an automobile according to an embodiment of the present invention.

In the present embodiment, as shown in FIG. 5, the seal section 28 of the side seal 22 has an open cross-section which is open towards the front side, but conversely to this, it is also possible to have an open cross-section which is open towards the rear side. An example of this is shown in FIG. 11. In the example in FIG. 11, the seal section 28 of the side seal 22 has a square C-shaped cross-sectional form which is open towards the rear side, and the vertical wall of the seal section 28 and the vertical wall 30c of the supporting section 30 are connected to each other in a continuous manner. Consequently, when the bonnet 6 is opened and the side seal 22 is viewed from the front side of the engine compartment 4, the front surface of the side seal 22 is viewed as a uniform flat surface and hence the visual appearance of the engine compartment 4 is improved.

Figure 12:
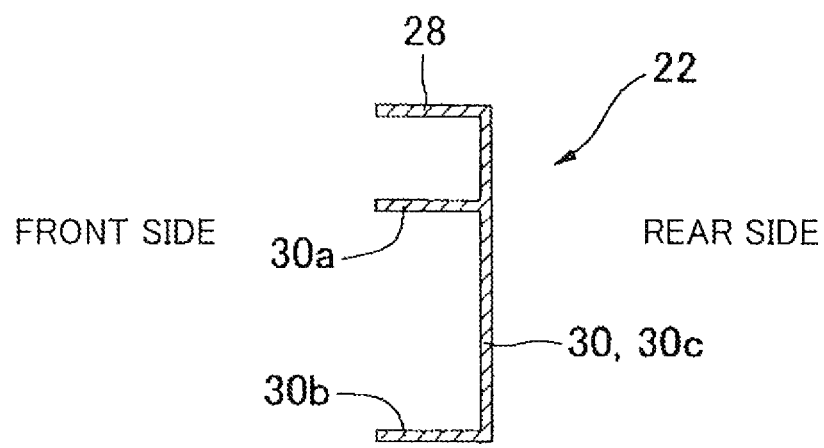
FIG. 12 is a cross-sectional diagram showing another modification example of a side seal of a body front structure for an automobile according to a further embodiment of the present invention.
Figure 13:
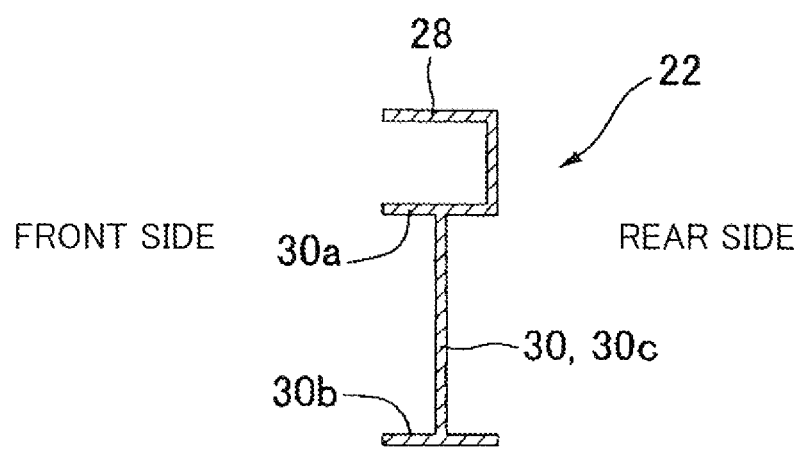
FIG. 13 is a cross-sectional diagram showing still another modification example of a side seal of a body front structure for an automobile according to a further embodiment of the present invention.

Moreover, in the embodiment described above, as shown in FIG. 5, the supporting section 30 of the side seal 22 has a square C-shaped cross-section which is open towards the rear side, but it may also adopt another cross-sectional shape. For example, as shown in FIG. 12, by connecting together the rear end sections of the upper wall 30a and the lower wall 30b of the supporting section 30 of the side seal 22 with the vertical wall 30c, it is possible to form the cross-section of the supporting section 30 in a square C-shaped form which is open towards the front side.

Furthermore, if the supporting section 30 of the side seal 22 is formed to have an I-shaped cross-section as shown in FIG.

Figure 14:
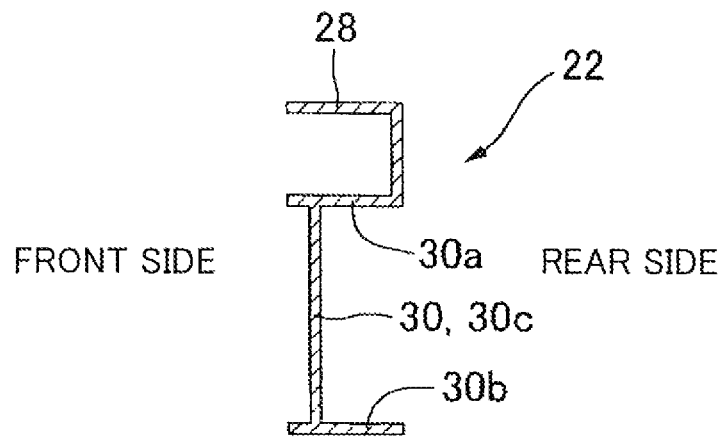
FIG. 14 is a cross-sectional diagram showing yet another modification example of a side seal of a body front structure for an automobile according to a further embodiment of the present invention.
Figure 15:
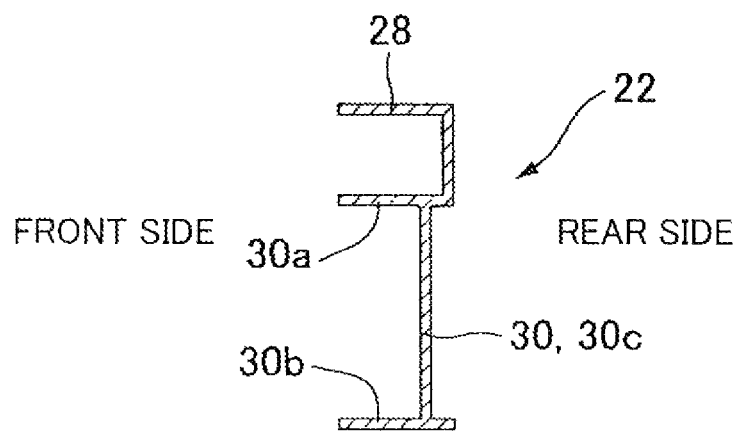
FIG. 15 is a cross-sectional diagram showing still yet another modification example of a side seal of a body front structure for an automobile according to a further embodiment of the present invention.
Figure 16:
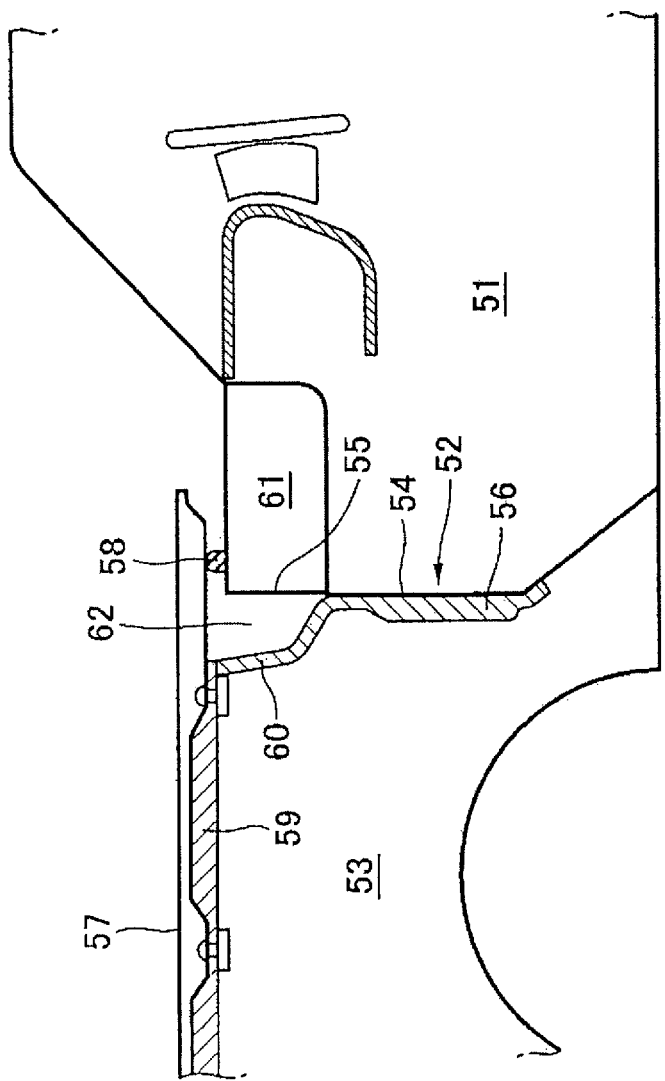
FIG. 16 is a cross-sectional diagram showing one example of a conventional prior art body front structure for an automobile.

13, in other words, if the centers of the upper wall 30a and the lower wall 30b of the supporting section 30 in the front/rear direction are connected by the vertical wall 30c, then the cross-section of the side seal 22 has a shape close to a front/rear symmetrical shape, and therefore the standing stability of the side seal 22 is further improved. If the cross-section of the supporting section 30 is formed as an I-shape, then the cross-sectional shape of the side seal 22 may also be formed as an asymmetrical I-shape which is close to a square C-shape, by shifting the position of the vertical wall 30c in the front/rear direction (in other words, by connecting the vertical wall 30c at a position shifted towards the front side or the rear side from the center of the upper wall 30a and the lower wall 30b in the front/rear direction), as shown respectively in FIG. 14 and FIG. 15. By adopting this composition, a flat surface is guaranteed over a relatively broad range in the portion of the upper surface of the lower wall 30b which is positioned on the front or rear side of the vertical wall 30c, and therefore it is possible to sufficiently guarantee the surface area of the body installation section 32 for installing the side seal 22 on the cowl grille 14 (the portion for installing the clip 31) while improving the standing stability of the side seal 22.

It is also possible to provide the upper wall 30a and the lower wall 30b at staggered positions in the front/rear direction, within a range which allows the side seal 22 to stand upright.

Furthermore, in the embodiment described above, a leg section 34 which projects towards the front side is provided in the vicinity of the outer end portion of the supporting section 30 of the side seal 22 in the vehicle width direction, but this leg section 34 may project towards the rear side (see FIG. 11) or may project towards both the front and rear sides. If the leg section 34 is provided so as to project towards the rear side, then when the bonnet 6 is opened and the side seal 22 is viewed from the front side of the engine compartment 4, the projecting leg section 34 is not visible, and therefore the visual appearance of the engine compartment 4 is improved. Furthermore, the center of gravity of the side seal 22 is located towards the rear and the side seal 22 is not liable to fall forwards.

Furthermore, in the embodiment described above, the seal section 28 of the side seal 22 is formed in an integrated manner with the center seal 20, but it is also possible to form the seal section 28 of the side seal 22 separately from the center seal 20. In this case, when the side seal 22 and the center seal 20 are installed on the body, desirably, the inside end of the seal section 28 of the side seal 22 in the vehicle width direction is installed so as to cover the center seal 20 which has a hollow cross-section. More specifically, if the seal section 28 of the side seal 22 has an open cross-section which is open to the front side as in FIG. 5, then the seal section 28 is installed so as to cover the rear surface of the outside end portion of the center seal 20 in the vehicle width direction, from the rear side. On the other hand, if the seal section 28 of the side seal 22 has an open cross-section which is open to the rear side as in FIG. 11, then the seal section 28 is installed so as to cover the front surface of the outside end portion of the center seal 20 in the vehicle width direction, from the front side.

Moreover, in the embodiment described above, the reinforcing ribs 30d forming reinforcing members are provided in an integrated manner on the rear surface side of the supporting section 30 of the side seal 22, but the reinforcing members do not have to be ribs that are integrated with the supporting section 30 and may also be separate members from the supporting section 30.

Lastly, the characteristic composition disclosed in the embodiment described above, and the beneficial effects obtained on the basis thereof, will be summarized.

The technology of the embodiment described above relates to a body front structure for an automobile having: a pair of fenders arranged on either side of a front of a body; a front compartment accommodating a drive source and arranged between these fenders; a bonnet which openably and closably covers the front compartment from above; and a cowl grille which extends in a vehicle width direction and includes a vertical wall section positioned between the front compartment and a cabin. The body front structure further has: a center seal, which is installed on an upper part of the vertical wall section of the cowl grille and is made from an elastic member that seals a gap between the vertical wall section of the cowl grille and the bonnet in a closed state; and side seals which are installed on the outer sides of the center seal in the vehicle width direction and are made from a material that is more flexible than the vertical wall section of the cowl grille. A void where the vertical wall section is not present is formed between each of the fenders and an outside end portion of the vertical wall section of the cowl grille in the vehicle width direction. The side seals each have a seal section which abuts against the bonnet in a closed state and a supporting section which supports the seal section from below, and extend substantially in the vehicle width direction so as to close off the void.

According to the body front structure configured as above, since a void where no vertical wall section is present is formed between the fender and the outer end portion of the vertical wall section of the cowl grille in the vehicle width direction, then in the central region of the cowl grille, the rigidity of the cowl grille during travel is guaranteed by the vertical wall section, while in the vicinity of the outer end portion of the vehicle width direction, the required collision stroke between the bonnett and the body member in the event of a collision with a pedestrian can be guaranteed by the void in the cowl grille. Furthermore, since the void is closed off by the side seal, then it is possible to prevent infiltration of noise into the inner side of the cowl grille (cabin) from the engine compartment, without decline in the collision performance. Moreover, since the side seal includes the seal section which abuts against the bonnet in a closed state and is deformed, and the supporting section for supporting the seal section from below, different functions are served by the seal section and the supporting section. As a result, the supporting section does not lose its shape, and airtight properties can be maintained over a long period of time.

In the present invention, desirably, the supporting section of the side seal has an upper wall and a lower wall extending in a front/rear direction on an upper edge and lower edge thereof, respectively, and has a vertical wall extending in an up/down direction so as to connect together the upper wall and lower wall.

By adopting this composition, the supporting section of the side seal has an I-shaped or square C-shaped cross-section, and the standing stability of the side seal is guaranteed, and therefore it is possible to prevent the occurrence of gaps due to long-term shape disruption, and sound insulating properties can be improved.

In the composition described above, more desirably, the supporting section of the side seal is formed in a square C shape or an asymmetrical I shape in a cross-sectional view, by connecting the vertical wall at a position shifted towards the front side or rear side from a center of the upper wall and the lower wall in the front/rear direction, and a body installation section for installing the side seal on the cowl grille is provided on the lower wall of the supporting section.

According to this composition, since a relatively broad flat surface is guaranteed in the portion of the upper surface of the lower wall of the supporting section which is positioned on the front or rear side of the vertical wall, then it is possible to sufficiently guarantee the surface area of the body installation section without increasing the overall thickness of the side seal in the front/rear direction (while keeping the side seal slim in the front/rear direction).

In the composition described above, desirably, the supporting section of the side seal is formed, in a cross-sectional view, in a square C shape which is open towards the rear side, or in an asymmetrical I shape in which the vertical wall is shifted towards the front side, and a reinforcing member is provided on a rear surface side of the vertical wall of the supporting section.

According to this composition, it is possible to reinforce the side seal effectively by means of the reinforcing members, while also improving the visual appearance of the interior of the front compartment when the bonnet is opened. Moreover, if the side seal is formed by die molding process, then a further merit is obtained in that a process of taking out the side seal from the die is facilitated.

In the present invention, desirably, the side seals each further has a leg section projecting from the supporting section in at least one of the front and rear directions.

According to this composition, the upright standing of the side seal is further facilitated, and leaking of noise from the front cabin to below the side seal can be suppressed.

In the present invention, desirably, the center seal has a hollow cross-section; and the seal section of the side seal has an open cross-section which is open towards the front side and is provided so as to form a continuous surface with an end portion of the center seal or so as to cover a rear surface of the center seal from the rear.

According to this composition, by providing the seal section in such a manner that the seal section of the side seal forms a continuous surface with the end portion of the center seal, or covers the rear surface of the center seal from the rear, while adopting an open cross-section which is easy to create by die molding, then the infiltration of water into the interior of the center seal can be prevented reliably.

The seal section of the side seal may also have an open cross-section which is open towards the rear side. In this case, the seal section is provided so as to form a continuous surface with the end portion of the center seal or so as to cover the front surface of the center seal from the front side.

In the present invention, desirably, the seal section of the side seal is connected to the center seal in an integrated manner.

By adopting this composition, it is possible reliably to prevent leaking of noise from gaps between the seal section of the side seal and the center seal, and furthermore the center seal can be supported by the side seal. Furthermore, compared to a case where the side seal and the center seal are formed separately, the unit price of the component increases, but it is possible to achieve a marked reduction (of up to ⅓) in the management time requirement and component packaging, and the like, on the production line.

In the present invention, desirably, the fenders each have a fender installation section extending inwards in the vehicle width direction, a gap is formed between the fender installation section and a body member positioned therebelow, and an end portion of the supporting section of the side seal is inserted into this gap.

According to this composition, it is possible to guarantee sound insulating properties below the fender, while achieving protection of a pedestrian who collides with the fender.

In the composition described above, more desirably, the seal section of the side seal includes an extension section which extends outwards in the vehicle width direction and the extension section is provided so as to cover the fender installation section.

According to this composition, the continuity of the seal is raised and furthermore the visual appearance of the interior of the front compartment can also be improved by concealing the fender installation section.

In the present invention, desirably, a strut tower fastening section is provided in the vicinity of a front surface of a side section of the cowl grille, and a bonnet hinge is provided in the vicinity of an outside end portion of the cowl grille in the vehicle width direction; the void is formed so as to avoid the strut tower fastening section; and the supporting section of the side seal is formed to have a higher rigidity than the center seal in such a manner that the side seal can stand upright, and is also formed in a curved or bent shape along the vehicle width direction so as to be arranged in a region extending from a rear position of the strut tower to a front position of the bonnet hinge.

According to this composition, since the rigidity of the supporting section of the side seal is higher than the center seal, it is possible to raise the upright stability of the side seal. Furthermore, since the supporting section of the side seal is arranged in a region between the strut tower and the bonnet hinge, while avoiding the strut tower fastening section, then it is possible to assemble and maintain the suspension without removing the cowl grille. Moreover, the rigidity of the side seal in the up/down direction can be improved by the fact that the supporting section of the side seal has a curved or bent shape. Furthermore, since a side seal having a height and elasticity (pliability) is arranged in the vicinity of the strut tower and the bonnet hinge, which have relatively high strength and are positioned in the vicinity of the cowl grille, then it is possible to increase the amount of collision absorption without creating excessive reaction force (damage) to a colliding object, such as a pedestrian.

As described above, according to the body front structure for an automobile according to the present invention, it is also possible to achieve protection of pedestrians, as well as preventing infiltration of noise into the cabin from the engine compartment.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A body front structure for an automobile comprising: a pair of fenders arranged on either side of a front of a body; a front compartment accommodating a drive source and arranged between these fenders; a bonnet which openably and closably covers the front compartment from above; and a cowl grille which extends in a vehicle width direction and includes a vertical wall section positioned between the front compartment and a cabin, the body front structure further comprising:

a center seal, which is installed on an upper part of the vertical wall section of the cowl grille and is made from an elastic member that seals a gap between the vertical wall section of the cowl grille and the bonnet in a closed state; and side seals which are installed on the outer sides of the center seal in the vehicle width direction and are made from a material that is more flexible than the vertical wall section of the cowl grille, wherein a void where the vertical wall section is not present is formed between each of the fenders and an outside end portion of the vertical wall section of the cowl grille in the vehicle width direction, the side seals each have a seal section which abuts against the bonnet in a closed state and a supporting section which supports the seal section from below, and extend substantially in the vehicle width direction so as to close off the void, the center seal has a hollow cross-section, and the seal section of the side seal has an open cross-section which is open towards the front side and is provided so as to form a continuous surface with an end portion of the center seal or so as to cover a rear surface of the center seal from the rear.

2. The body front structure for an automobile according to claim 1, wherein the side seals each further has a leg section projecting from the supporting section in at least one of the front and rear directions.

3. The body front structure for an automobile according to claim 1, wherein the seal section of the side seal is connected to the center seal in an integrated manner.

4. The body front structure for an automobile according to claim 1, wherein a strut tower fastening section is provided in the vicinity of a front surface of a side section of the cowl grille, and a bonnet hinge is provided in the vicinity of an outside end portion of the cowl grille in the vehicle width direction, the void is formed so as to avoid the strut tower fastening section, and the supporting section of the side seal is formed to have a higher rigidity than the center seal in such a manner that the side seal can stand upright, and is also formed in a curved or bent shape along the vehicle width direction so as to be arranged in a region extending from a rear position of the strut tower to a front position of the bonnet hinge.

5. A body front structure for an automobile comprising: a pair of fenders arranged on either side of a front of a body; a front compartment accommodating a drive source and arranged between these fenders; a bonnet which openably and closably covers the front compartment from above; and a cowl grille which extends in a vehicle width direction and includes a vertical wall section positioned between the front compartment and a cabin, the body front structure further comprising:

a center seal, which is installed on an upper part of the vertical wall section of the cowl grille and is made from an elastic member that seals a gap between the vertical wall section of the cowl grille and the bonnet in a closed state; and side seals which are installed on the outer sides of the center seal in the vehicle width direction and are made from a material that is more flexible than the vertical wall section of the cowl grille, wherein a void where the vertical wall section is not present is formed between each of the fenders and an outside end portion of the vertical wall section of the cowl grille in the vehicle width direction, the side seals each have a seal section which abuts against the bonnet in a closed state and a supporting section which supports the seal section from below, and extend substantially in the vehicle width direction so as to close off the void, and the fenders each have a fender installation section extending inwards in the vehicle width direction, a gap is formed between the fender installation section and a body member positioned therebelow, and an end portion of the supporting section of the side seal is inserted into this gap.

6. The body front structure for an automobile according to claim 5, wherein the seal section of the side seal includes an extension section which extends outwards in the vehicle width direction and the extension section is provided so as to cover the fender installation section.

7. The body front structure for an automobile according to claim 5, wherein the side seals each further has a leg section projecting from the supporting section in at least one of the front and rear directions.

8. The body front structure for an automobile according to claim 5, wherein the seal section of the side seal is connected to the center seal in an integrated manner.

9. The body front structure for an automobile according to claim 5, wherein a strut tower fastening section is provided in the vicinity of a front surface of a side section of the cowl grille, and a bonnet hinge is provided in the vicinity of an outside end portion of the cowl grille in the vehicle width direction, the void is formed so as to avoid the strut tower fastening section, and the supporting section of the side seal is formed to have a higher rigidity than the center seal in such a manner that the side seal can stand upright, and is also formed in a curved or bent shape along the vehicle width direction so as to be arranged in a region extending from a rear position of the strut tower to a front position of the bonnet hinge.

10. A body front structure for an automobile comprising: a pair of fenders arranged on either side of a front of a body; a front compartment accommodating a drive source and arranged between these fenders; a bonnet which openably and closably covers the front compartment from above; and a cowl grille which extends in a vehicle width direction and includes a vertical wall section positioned between the front compartment and a cabin, the body front structure further comprising:

a center seal, which is installed on an upper part of the vertical wall section of the cowl grille and is made from an elastic member that seals a gap between the vertical wall section of the cowl grille and the bonnet in a closed state; and side seals which are installed on the outer sides of the center seal in the vehicle width direction and are made from a material that is more flexible than the vertical wall section of the cowl grille, wherein a void where the vertical wall section is not present is formed between each of the fenders and an outside end portion of the vertical wall section of the cowl grille in the vehicle width direction, the side seals each have a seal section which abuts against the bonnet in a closed state and a supporting section which supports the seal section from below, and extend substantially in the vehicle width direction so as to close off the void, and the supporting section of the side seal has an upper wall and a lower wall extending in a front/rear direction on an upper edge and lower edge thereof, respectively, and has a vertical wall extending in an up/down direction so as to connect together the upper wall and lower wall.

11. The body front structure for an automobile according to claim 10, wherein the side seals each further has a leg section projecting from the supporting section in at least one of the front and rear directions.

12. The body front structure for an automobile according to claim 10, wherein the seal section of the side seal is connected to the center seal in an integrated manner.

13. The body front structure for an automobile according to claim 10,
wherein a strut tower fastening section is provided in the vicinity of a front surface of a side section of the cowl grille, and a bonnet hinge is provided in the vicinity of an outside end portion of the cowl grille in the vehicle width direction,
the void is formed so as to avoid the strut tower fastening section, and
the supporting section of the side seal is formed to have a higher rigidity than the center seal in such a manner that the side seal can stand upright, and is also formed in a curved or bent shape along the vehicle width direction so as to be arranged in a region extending from a rear position of the strut tower to a front position of the bonnet hinge.

14. The body front structure for an automobile according to claim 10, wherein the supporting section of the side seal is formed in a square C shape or an asymmetrical I shape in a cross-sectional view, by connecting the vertical wall at a position shifted towards the front side or rear side from a center of the upper wall and the lower wall in the front/rear direction, and a body installation section for installing the side seal on the cowl grille is provided on the lower wall of the supporting section.

15. The body front structure for an automobile according to claim 14, wherein the supporting section of the side seal is formed, in a cross-sectional view, in a square C shape which is open towards the rear side, or in an asymmetrical I shape in which the vertical wall is shifted towards the front side, and a reinforcing member is provided on a rear surface side of the vertical wall of the supporting section.

* * * * *